Patented Jan. 27, 1953

2,626,941

UNITED STATES PATENT OFFICE 2,626,941

WATER IMPERMEABLE, WATER VAPOR PERMEABLE COATING

Bruce W. Habeck, Akron, Ohio, assignor to Wingfoot Corporation, Akron, Ohio, a corporation of Delaware No Drawing. Application August 15, 1949, Serial No. 110,473

22 Claims. (Cl. 260—33.6)

This invention relates to the preparation of coatings which are particularly designed for use on water vapor permeable supports to produce a coated support which is impermeable to liquid water but is permeable to water vapor, and to the products obtained.

In the preparation of raincoats and other waterproof clothing, tents, tarpaulins and similar products, treatments to render the product waterproof frequently result in a product which is also impervious to the passage of water vapor. As a result of this imperviousness to water vapor, water vapor on the interior of the structure cannot readily escape. This water vapor can even build up to such a concentration that condensation results. In the case of waterproof garments, such as raincoats, the water vapor in the interior of the garment sometimes makes the wearer extremely uncomfortable and reduces his physical efficiency. Efforts have previously been made to produce materials impervious to liquid water but pervious to water vapor. One approach to the problem has been to treat fabric chemically to make it less readily wetted by water. Another approach has been to coat fabric with rubber-like materials compounded with particular finely divided fillers in a particular manner. Some have thought that it was necessary to use hydrophobic fillers and have used fillers specially treated to increase their hydrophobic character. Some have thought that it was necessary to use a porous filler.

According to the present invention, it has been discovered that non-porous fillers can be used and that the fillers need not be hydrophobic, provided that the proper conditions are met. Moreover, the water-proof products of the invention are much more resistant to the penetration of water than the usual water-repellant fabrics and have a much higher water vapor transmission rate than the usual coated fabrics.

According to the practice of the invention, a dispersion in water or an organic solvent of a water-insoluble coating material is compounded with finely divided, solid, non-porous fillers or pigments in an amount not less than that represented by the formula $$x = 45.87 + 21.44y - 0.938y^2 + 1.625y^3$$

in which $x$ equals grams of filler per 100 cubic centimeters of the coating material and $y$ equals one-tenth the wet density (in pounds per cubic foot) of the filler in the dispersing medium in the dispersion. By "coating material" is meant the bonding material or base of the compounded coating, as hereinafter illustrated. A coating of this compounded dispersion is then applied to a water-vapor permeable support, after which the dispersing medium is removed by evaporation.

The coating produced is a microporous structure containing interconnected pores which are small enough to prevent the passage of liquid water and numerous enough to permit the passage of water vapor at a relatively high rate.

The wet density of the filler can be determined as follows: One gram of the filler is weighed to the fourth decimal place into a 15 milliliter graduated centrifuge tube. Employing the dispersing medium used in the dispersion, the filler is carefully and fully wetted, adding an excess of the dispersing medium to fill the tube. The filled tube is centrifuged at approximately 2500 R. P. M. until the wetted filler reaches constant volume. The volume of the wetted filler in cubic centimeters is divided into 62.4 to put the wet density on the basis of pounds per cubic foot.

The filler desirably has a wet density less than 80 pounds per cubic foot in toluene and the preferred range is from 15 to 60 pounds per cubic foot. A preferred filler is calcium carbonate having a wet density in toluene of about 20 to 50 and particularly from about 25 to 32. Precipitated calcium carbonates are particularly adaptable to use in the invention.

As the amount of filler employed is increased over the minimum loading defined by the foregoing equation, the rate of moisture vapor transmission increases until usually it reaches a maximum or is limited by the moisture vapor transmission rate of the support. Ordinarily, the resistance to the passage of liquid water remains high until after the maximum moisture vapor transmission is reached. As the loading is increased, the coating eventually becomes weak and short and is less generally useful. From the standpoint of strength, flexibility and resistance to abrasion, washing, dry cleaning and aging, the practical upper limit on loading is somewhere near the point where the maximum moisture vapor transmission is reached. Ordinarily, there will be no advantage in exceeding five times the minimum loading and the best combination of properties will usually be obtained from the minimum to twice the minimum loading.

Various water-insoluble coating materials may be employed as the bonding material or base of the compounded coating. Among the representative types of materials which can be so used are natural rubber; polymers and copolymers of dienes, such as polychloroprene, polyisoprene, polybutadiene and copolymers of butadiene-1,3 or isoprene with other polymerizable monomers such as styrene, acrylonitrile and various acrylates; vinyl chloride resins such as polyvinyl chloride and copolymers of vinyl chloride with other polymerizable monomers such as vinylidene chloride, vinyl acetate, diethyl fumarate, diethyl maleate and various acrylates; the polyvinyl acetals such as polyvinyl butyral; copolymers of a major proportion of a monolefinic compound such as isobutylene with a minor proportion of a diene such as butadiene-1,3 or isoprene; polyamides; polyesters; and polyacrylates such as polymers of methyl acrylate, methyl methacrylate and methyl chloracrylate. Because of flexibility and other physical characteristics, a rubber such as natural rubber or the various synthetic rubbers constitute a preferred class of materials. Neoprene, or polychloroprene, has a particularly good combination of properties, being outstanding in aging and in its resistance to dry cleaning.

Either latices, i. e., aqueous dispersions, or organic solvent dispersions of the bonding materials can be used.

The bonding materials can be additionally compounded according to known practices with plasticizers, age resistors, accelerators, waxes, resins, etc. The addition of wax to a coating composition of polychloroprene and precipitated calcium carbonate has been found to improve the coating in its aging and in its waterproofness, especially after flexing or aging and flexing.

Any water vapor permeable support may be used provided that its other properties are appropriate to the intended use of the product. Representative examples of suitable textile fabrics are those formed from cotton, regenerated cellulose, cellulose acetate, linear polyamides, linear polyesters and glass. Supports other than fabric, such as paper and leather, may also be used. Cotton cloth gives particularly good results. A fine, tightly woven fabric is preferred since it flexes well and minimizes "strike-through" of the coating.

If the filler is mechanically worked into the solid binding material, e. g., on a rubber mill or in an internal mixer, the desired microporosity is not obtained and the product does not transmit water vapor at a high rate. For this reason, the filler is added to a dispersion of the bonding or coating material in water or an organic solvent and is dispersed therein in a type of mixer which does not subject the mixture to undue grinding. This is a general technique well-known in the rubber and other related arts. Various cement mixers such as the Day mixer and Poney mixer may be employed or a tank equipped with a stirrer or agitator may be used.

The preparation of the coating compositions is illustrated by the following examples:

Example 1

One hundred parts by weight of polychloroprene, 5 parts of carbon black, 2 parts of phenyl-beta-naphthylamine, 5 parts of wax and 12 parts of zinc oxide are dispersed in enough toluene to produce a cement having a viscosity of about 5,000 centipoises. One hundred fifty-five parts of precipitated calcium carbonate are then worked into this cement in a conventional cement mixer, such as a Day mixer or Poney mixer, preferably adding more toluene as the mixing proceeds to maintain the viscosity at about 5,000 centipoises. Two parts of catechol are added just before spreading the cement.

Example 2

One hundred parts by weight of polychloroprene are given a short breakdown in an internal type mixer, the temperature preferably being held below 240° F. Five parts of wax, two parts of phenyl-beta-naphthylamine and five parts of carbon black are then added and dispersed in the shortest possible time. This stock is allowed to "rest" overnight and is then remilled on an 84 inch rubber mill for approximately 10 to 15 minutes. Unless the stock is used immediately, it should be "warmed up" by remilling for about ten minutes just before making it into a cement. One hundred fifty-five parts by weight of precipitated calcium carbonate, twelve parts of zinc oxide, 256 parts of toluene and 86 parts of solvent naphtha are put into a cement mixer and stirred for a short time to thoroughly wet the pigment. The previously-prepared rubber stock is then added to the mixer, the lid is closed and mixing is continued until a smooth cement is obtained. Two parts of catechol are added just before spreading the cement.

The coating compositions of the invention can be applied to the support by various means. For example, samples have been prepared by applying a coating of the cement with an ordinary paint brush. However, on a production basis, it is convenient and practical to use a standard rubber cement spreader. Best results are obtained by applying several coats. The first coat is preferably applied in such a manner as to force the cement into intimate contact with the support and get a good bond between the coating and the support. This may be done, for example, by applying a tight-gage coat by bringing the spreader blade down on the support as tightly as possible while still allowing the support to slide between the blade and the bed plate. Another method is to apply a scrape gage coat, using no bed plate but forcing the support against the blade by tension during spreading. Additional coats may be applied in the same manner or with a clearance between the blade and the support to build up the thickness of the coating. Very good results have been obtained with one tight gage coat, followed by two coats spread with a clearance. The weight of the finished coating can be varied considerably but, in practice, is usually between 2.5 and 5 ounces per square yard. It is possible to get good original properties with a weight of coating less than 2.5 ounces per square yard but, in some cases, the coated products did not age well. Above five ounces per square yard, the added weight is undesirable with no particular advantages. Very good laminated products have been made. For example, two pieces of fabric can be given a tight or scrape gage coat, after which the two pieces are sandwiched with additional cement, with the coated faces on the inside. If desired, the support can be coated on both sides, but applying the coating on only one side and making clothing or other articles with the coating on the inside gives a waterproof, water vapor permeable garment with the exterior appearance of untreated cloth.

After the fabric or other support is coated, the coated product is vulcanized or cured, if such treatment is desirable or necessary with the particular coating composition employed. Thus when natural or synthetic rubber is used the coated material can be vulcanized by the usual techniques except that it is desirable to avoid the use of high pressures since they tend to destroy the microporous structure. Fabric coated with natural or synthetic rubber is normally vulcanized at room temperature or in a hot room but if higher temperatures are required, the coated fabric is wrapped on a mandrel, covered with a protective liner and cured in open steam.

The following table shows typical results obtained with representative embodiments of the invention.

| Filler | Binder | Loading in grams per 100 grams of Binder | Wet density of pigment in toluene | Hydrostatic Head in Centimeters of water | Moisture Vapor Transmission in grams per sq. meter |
|---|---|---|---|---|---|
| Bentonite | 75 Butadiene 25 Styrene Synthetic GR-S | 233 | 31.7 | 248 | 29 |
| Kalvan | GR-S | 200 | 33.7 | 102 | 24 |
| Irish Moss | GR-S | 220 | 36.7 | 300 | 22 |
| Albacar 5970 | GR-S | 200 | 28.4 | 300 | 30 |
| Silene EF | GR-S | 164 | 19.5 | 110 | 43 |
| Water ground mica, 3000 mesh size (theoretical). | GR-S | 254 | 32.8 | 300 | 16 |
| Magnesium Carbonate (fine grade). | Polychloroprene | 185 | 11.6 | 150 | 39 |
| Fine graphite | do | 365 | 46.1 | 92 | 34 |
| Pulverized silica | do | 1,075 | 74 | 46 | 35 |
| Titanium dioxide | do | 485 | 53.5 | 70 | 34 |
| Air-floated fibrous magnesium silicate. | do | 450 | 59.5 | 155 | 32 |
| Atomite | do | 575 | 49.9 | 210 | 32 |
| Natural Whiting | do | 2,000 | 83.3 | 44 | 34 |
| Lesamite | do | 1,100 | 75.2 | 81 | 27 |

In the above table, the fillers identified by trade name are further identified as follows.

Kalvan is an ultrafine, coated, precipitated calcium carbonate, sold by R. T. Vanderbilt and company.

Albacar 5970 is a precipitated calcium carbonate with particles having an average diameter of about 0.25 micron, sold by C. K. Williams and Company.

Silene EF is a hydrated, precipitated calcium silicate sold by Pittsburgh Plate Glass Company (Columbia Chemical Division).

Atomite is ground, natural calcium carbonate, sold by Thompson-Weinman and Company.

Lesamite is natural calcium carbonate with an average particle size of approximately 10 microns, sold by Thompson-Weinman and Company.

Further representative examples of the fillers or pigments used are wood flour, iron oxide, various carbon blacks (such as channel black, semi-reinforcing furnace black, conductive furnace blacks, and the ultra-fine blacks used as ink and paint pigments), pyrophyllite or aluminum silicate, various clays and talc.

In many of the examples in the table, the loading was higher than that given by the formula previously recited, which represents the minimum loading necessary to give a moisture vapor transmission rate substantially better than that of the support carrying a like weight of coating of the binder. On the moisture vapor transmission scale used above, a coated fabric using an ordinary rubber compound and applying a like weight of coating ranges between about 3 and 5 grams per hour per square meter. The value for hydrostatic head was determined by ASTM tentative test D-583-40-T, Procedure B, except that the reading was taken for the fifth drop of water to penetrate the sample instead of the third drop. The MVT (moisture vapor transmission rate) was measured as follows.

The coated fabric sample to be tested was placed on a glass Petri dish about 3.5 inches in diameter and about 2.3 centimeters in depth and the edges were sealed to the dish with beeswax. If several dishes are used, their diameters and depths must be closely alike in order to secure an accurate comparison. In particular, it has been found that the air space between the water level and the fabric sets up a resistance and should be the same from one sample to the next. Fifty cubic centimeters of water were added to the dish with a hypodermic needle. The hole in the sample caused by the needle was covered with a drop of beeswax. A control sample was prepared at the same time in the same manner using a plain weave cotton balloon cloth weighing two ounces per square yard and having a warp count of 133 and a fill count of 134. The dishes were then allowed to stand overnight to come to equilibrium and a weighing was made. Six hours later, another weighing was made and the samples were again allowed to stand overnight. The final weighing was then obtained. The loss in weight between weighings was determined. All of the above is preferably carried on in a room in which the temperature and humidity are controlled, e. g. at 77° F. and 52 percent humidity. The average moisture vapor transmission of the control, determined over a long period of time at room conditions, was 47.5 grams per hour per square meter. The test data were related to this average by the formula Weight loss of sample being tested $\times$ $$\frac{47.5}{\text{Weight loss of control}} =$$

MVT of sample being tested

The MVT (moisture vapor transmission rate) in the table is the average of overnight readings.

I claim:

1. A process for preparing a water impermeable, water vapor permeable, coated support which comprises (1) applying to a support capable of transmitting water vapor in the uncoated condition a coating of a composition obtained by dispersing in a dispersion of a water-insoluble coating material a finely divided, solid, non-porous filler having a wet density in toluene of not more than 80 pounds per cubic foot in an amount not less than that represented by the formula $$x = 45.87 + 21.44y - 0.938y^2 + 1.625y^3$$

in which $x$ equals grams of filler per 100 cubic centimeters of the coating material and $y$ equals one-tenth the wet density, in pounds per cubic foot, of the filler in the dispersing medium of the dispersion and (2) removing the dispersing medium from the coating.

2. A process for preparing a water impermeable, water vapor permeable coated fabric which comprises (1) applying to a fabric a coating of a composition obtained by dispersing in a dispersion of a rubber a finely divided, solid, non-porous filler having a wet density in toluene between 15 and 40 pounds per cubic foot, in an amount not less than that represented by the formula $$x = 45.87 + 21.44y - 0.938y^2 + 1.625y^3$$

in which $x$ equals grams of filler per 100 cubic centimeters of the rubber and $y$ equals one-tenth the wet density, in pounds per cubic foot, of the filler in the dispersing medium of the dispersion, (2) removing the dispersing medium from the coating and (3) vulcanizing the coated fabric.

3. A process according to claim 2 in which a plurality of coatings of the resulting composition is applied to the fabric.

4. A process for preparing a water impermeable, water vapor permeable coated fabric which comprises (1) applying to a fabric support at least one coating of a composition obtained by dispersing in a toluene dispersion of polychloroprene a finely divided calcium carbonate having a wet density in toluene of about 25 to 50 pounds per cubic foot, in an amount not less than that represented by the formula $$x = 45.87 + 21.44y - 0.938y^2 + 1.625y^3$$

in which $x$ equals grams of calcium carbonate per 100 cubic centimeters of polychloroprene and $y$ equals one-tenth the wet density, in pounds per cubic foot, of the calcium carbonate in the dispersing medium of the dispersion, (2) removing the toluene from the coating and (3) vulcanizing the coated fabric.

5. A process for preparing a coating composition for use in preparing water impermeable, water vapor permeable coatings which comprises dispersing in a dispersion of a rubber a finely divided, solid, non-porous filler having a wet density in toluene of not more than 80 pounds per cubic foot, in an amount not less than that represented by the formula $$x = 45.87 + 21.44y - 0.938y^2 + 1.625y^3$$

in which $x$ equals grams of filler per 100 cubic centimeters of the rubber and $y$ equals one-tenth the wet density, in pounds per cubic foot, of the filler in the dispersing medium of the dispersion.

6. A process for preparing a coating composition for use in preparing water impervious, water vapor permeable coatings which comprises dispersing in a toluene dispersion of a rubber a finely divided, solid, non-porous filler having a wet density in toluene between 15 and 40 pounds per cubic foot, in an amount not less than that represented by the formula $$x = 45.87 + 21.44y - 0.938y^2 + 1.625y^3$$

in which $x$ equals grams of the filler per 100 cubic centimeters of the rubber and $y$ equals one-tenth the wet density, in pounds per cubic foot, of the filler in the solvent in the rubber dispersion.

7. A process for preparing a coating composition for use in preparing water impermeable, water vapor permeable coatings which comprises mixing a rubber, a solvent for the rubber and a finely divided, solid, non-porous filler having a wet density in toluene of not more than 80 pounds per cubic foot, in an amount not less than that represented by the formula $$x = 45.87 + 21.44y - 0.938y^2 + 1.625y^3$$

in which $x$ equals grams of the filler per 100 cubic centimeters of the rubber and $y$ equals one-tenth the wet density, in pounds per cubic foot, of the filler in the solvent and mechanically working the mixture until a substantially homogeneous, spreadable, pigmented dispersion of the rubber is obtained.

8. A process for preparing a coating composition for use in preparing water impermeable, water vapor permeable coated fabric which comprises dispersing in a dispersion of polychloroprene in toluene finely divided, precipitated calcium carbonate having a wet density in toluene of about 28 to 32, in an amount not less than that represented by the formula $$x = 45.87 + 21.44y - 0.938y^2 + 1.625y^3$$

in which $x$ equals grams of calcium carbonate per 100 cubic centimeters of polychloroprene and $y$ equals one-tenth the wet density, in pounds per cubic foot, of the calcium carbonate in toluene.

9. A water impermeable, water vapor permeable sheet material comprising a water vapor permeable support carrying on at least one surface thereof a coating consisting of a microporous residue of a dispersion of a rubber which rubber dispersion has dispersed therein a finely divided, solid, non-porous filler having a wet density in toluene of not more than 80 pounds per cubic foot, in an amount not less than that represented by the formula $$x = 45.87 + 21.44y - 0.938y^2 + 1.625y^3$$

in which $x$ equals grams of the filler per 100 cubic centimeters of the rubber and $y$ equals one-tenth the wet density, in pounds per cubic foot, of the filler in the dispersing medium in the dispersion from which the coating is deposited.

10. A water impermeable, water vapor permeable sheet material comprising a textile fabric carrying on at least one surface thereof a microporous coating of a rubber deposited from a rubber dispersion which has dispersed therein a solid, non-porous filler having a wet density in toluene between 15 and 40 pounds per cubic foot, in an amount not less than that represented by the formula $$x = 45.87 + 21.44y - 0.938y^2 + 1.625y^3$$

in which $x$ equals grams of filler per 100 cubic centimeters of rubber and $y$ equals one-tenth the wet density, in pounds per cubic foot, of the filler in the solvent or dispersing medium in the rubber dispersion from which the coating is deposited.

11. A water impervious, water vapor permeable sheet material comprising a cotton fabric carrying on at least one surface thereof a microporous spread coating of a rubber deposited from a rubber dispersion which has dispersed therein a finely divided, solid, non-porous filler having a wet density in toluene of not more than 80 pounds per cubic foot, in an amount not less than that represented by the formula $$x = 45.87 + 21.44y - 0.938y^2 + 1.625y^3$$

in which $x$ equals grams of the filler per 100 cubic centimeters of the rubber and $y$ equals one-tenth the wet density, in pounds per cubic foot, of the filler in the dispersing medium in the rubber dispersion from which the coating is deposited.

12. A water impermeable, water vapor permeable sheet material comprising a tightly woven cotton fabric carrying on one surface thereof a microporous, coating of polychloroprene deposited from a polychloroprene dispersion which has dispersed therein a calcium carbonate pigment having a wet density in toluene of about 28 to 32 pounds per cubic foot, in an amount not less than that represented by the formula $$x=45.87+21.44y-0.938y^2+1.625y^3$$

in which $x$ equals grams of calcium carbonate per 100 cubic centimeters of polychloroprene and $y$ equals one-tenth the wet density, in pounds per cubic foot, of the calcium carbonate in the solvent or dispersing medium in the dispersion of polychloroprene from which the coating is deposited.

13. A water impermeable, water-vapor permeable sheet material comprising a tightly woven cotton fabric carrying on one surface thereof a microporous, deposited coating of polychloroprene which has dispersed therein a calcium carbonate pigment having a wet density in toluene of about 28 to 32 pounds per cubic foot, in an amount not less than that represented by the formula $$x=45.87+21.44y-0.938y^2+1.625y^3$$

in which $x$ equals grams of calcium carbonate per 100 cubic centimeters of polychloroprene and $y$ equals one-tenth the wet density, in pounds per cubic foot, of the calcium carbonate in the solvent or dispersing medium in the dispersion of polychloroprene from which the coating is deposited, said coating being the deposit of solids from a polychloroprene dispersion having said calcium carbonate dispersed therein.

14. A coating composition for use in preparing water impermeable, water vapor permeable coatings which is the product obtained by dispersing in a dispersion of a rubber, a finely divided, solid, non-porous filler having a wet density in toluene of not more than 80 pounds per cubic foot, in an amount not less than that represented by the formula $$x=45.87+21.44y-0.938y^2+1.625y^3$$

in which $x$ equals grams of filler per 100 cubic centimeters of the rubber and $y$ equals one-tenth the wet density, in pounds per cubic foot, of the filler in the dispersing medium of the dispersion.

15. A coating composition for use in preparing water impervious, water vapor permeable coatings which is the product obtained by dispersing in a toluene dispersion of a rubber a finely divided, solid, non-porous filler having a wet density in toluene between 15 and 40 pounds per cubic foot, in an amount not less than that represented by the formula $$x=45.87+21.44y-0.938y^2+1.625y^3$$

in which $x$ equals grams of the filler per 100 cubic centimeters of the rubber and $y$ equals one-tenth the wet density, in pounds per cubic foot, of the filler in the solvent in the rubber dispersion.

16. A coating composition for use in preparing water impermeable, water vapor permeable coatings which is the product obtained by mixing a rubber, a solvent for the rubber and a finely divided, solid, non-porous filler having a wet density in toluene of not more than 80 pounds per cubic foot, in an amount not les than that represented by the formula $$x=45.87+21.44y-0.938y^2+1.625y^3$$

in which $x$ equals grams of the filler per 100 cubic centimeters of the rubber and $y$ equals one-tenth the wet density, in pounds per cubic foot, of the filler in the solvent and mechanically working the mixture until a substantially homogeneous, spreadable, pigmented dispersion of the rubber is obtained.

17. A coating composition for use in preparing water impermeable, water vapor permeable coated fabric which is the product obtained by dispersing in a dispersion of polychloroprene in toluene finely divided, precipitated calcium carbonate having a wet density in toluene of about 28 to 32, in an amount not less than that represented by the formula $$x=45.87+21.44y-0.938y^2+1.625y^3$$

in which $x$ equals grams of calcium carbonate per 100 cubic centimeters of polychloroprene and $y$ equals one-tenth the wet density, in pounds per cubic foot, of the calcium carbonate in toluene.

18. A sheet material according to claim 9 in which the coating weighs at least 2.5 ounces per square yard.

19. A sheet material according to claim 10 in which the coating weighs at least 2.5 ounces per square yard.

20. A sheet material according to claim 11 in which the coating weighs from 2.5 to 5 ounces per square yard.

21. A sheet material according to claim 12 in which the coating weighs from 2.5 to 5 ounces per square yard.

22. A sheet material according to claim 13 in which the coating weighs from 2.5 to 5 ounces per square yard.

BRUCE W. HABECK.

REFERENCES CITED

The following references are of record in the file of this patent:

UNITED STATES PATENTS

| Number | Name | Date |
|---|---|---|
| 1,048,912 | Strickler | Dec. 31, 1912 |
| 1,967,863 | Collins et al. | July 24, 1934 |
| 2,002,622 | Williams et al. | May 28, 1935 |
| 2,009,778 | Cronquest et al. | July 30, 1935 |
| 2,192,705 | Evans et al. | Mar. 5, 1940 |
| 2,424,736 | Brams | July 29, 1947 |
| 2,477,336 | Jennings | July 26, 1949 |
| 2,487,060 | Pike et al. | Nov. 8, 1949 |